Patented June 25, 1940

2,205,807

UNITED STATES PATENT OFFICE 2,205,807

PLANT GROWTH STIMULANT

Johan Bjorksten, Chicago, Ill.

No Drawing. Application December 18, 1939,
Serial No. 309,919

19 Claims. (Cl. 47—58)

This invention relates to means for promoting or accelerating plant growth, and more specifically to compositions of matter which have growth promoting, accelerating or regulating effects on plants, and to methods for utilizing such effects.

An object of the invention is to provide new compositions possessing beneficial influence on the growth or development of plants.

Another object is to provide substantially stable liquid compositions having even in great dilutions marked growth stimulating effects on plants.

Another object is to provide compositions of matter which even in great dilutions stimulate the growth of leaves as well as the growth of roots of higher plants.

Another object is a method for facilitating rooting or development of plant cuttings, and compositions useful for this purpose.

Another object is a method for facilitating the healing of wounds in plants, and compositions useful for this purpose.

Another object is to provide compositions which stimulate, accelerate or promote the growth of plant cells.

Further objects will become apparent from the following detailed description:

It is known that plant growth is stimulated by dilute solutions of thiamin, or vitamin $B_1$, and also by biotin, and that a combination of these substances gives results superior to those produced by either substance alone. However, owing to the very high cost of thiamin and of biotin, and to their relative instability in solution, no preparation containing these substances has as yet been commercially available.

According to this invention a composition of excellent growth promoting properties for plant cells at greatly reduced cost is obtained if instead of thiamin is used a mixture of 4-methyl-5-beta-hydroxyl-ethyl-thiazole and 2-methyl-5-ethoxymethyl-6-amino-pyrimidine or of salts of these substances. Very surprisingly, if these two substances are used in substantially equimolecular proportions, the time of exposure required to effect a certain growth response is shorter than the time required for the same growth response if a corresponding amount of thiamin had been used. On continuous exposure to the solutions, the growth response is identical, but on an exposure of a few minutes, or hours, the mixture of 2-methyl-5-ethoxymethyl-6-amino-pyrimidine and 4-methyl-5-beta-hydroxy-ethyl-thiazole effects a greater growth response than a solution of identical volume containing that amount of thiamin which would have been formed by quantitative condensation of the two above named substances.

While I do not wish to commit myself to any theory regarding the cause of this unexpected superiority of the mixture of 4-methyl-5-beta-hydroxy-ethyl-thiazole and 2-methyl-5-ethoxymethyl-6-amino-pyrimidine to a corresponding amount of thiamin for stimulating the growth of plant cells on short exposure, it is believed that the explanation lies in differences in time required for entering the root system of the plants, and for further transportation within the plants to those cells on which the growth promoting effect is exerted, and particularly in the time required for penetration of the cell membranes. It appears that more time is needed for diffusion, transportation and penetration of the large thiamin molecules, than for the smaller molecules of 4-methyl-5-beta-hydroxy-ethyl-thiazole and 2-methyl-5-ethoxymethyl-6-amino-pyrimidine, and that accordingly, on short exposure, thiamin will act less rapidly than the combination of substances set forth in this application.

The compositions of this invention cause a greater growth response in plants than either solutions of thiamin or of biotin alone, and they give a more rapid response than a mixture of thiamin and biotin does. The more rapid effects of the compounds of this invention are desirable in treating cuttings or inoculations on plants, because of the shorter time necessary for the treatment, and in watering plants with very dilute solutions of the substances, because more rapid absorption of the substances by the plants treated will reduce losses due to bacterial action and to possible washing away of the active substances by subsequent rains or irrigation. Further, the cost of these compositions is substantially less than that of a thiamine solution of similar efficacy. The mixture of 4-methyl-5-beta-hydroxy-ethyl-thiazole and 2-methyl-5-ethoxymethyl-6-amino pyrimidine is obviously much less costly than thiamin, since thiamin is made synthetically from the two above mentioned components, by procedures involving much labor and substantial losses in material.

Generally, I prefer to use the composition in the form of a solution. As a solvent I may use any substance which is a solvent for the ingredients employed, which does not too adversely affect the stability of these ingredients, and which is not deleterious to plants in the dilutions contemplated. For example, suitable solvents are water, glycerine and ethyl alcohol, and combinations of these substances.

Further, I generally find it advantageous to include an acid, such as ortho phosphoric or citric acid, because the stability of the substances contemplated is higher in acid than in neutral or alkaline solutions. Further, I may include a buffer salt such as mono potassium ortho phosphate, for maintaining the desired state of acidity even when the composition is diluted. I may also include antiseptic materials, to prevent bacterial contamination, coloring substances, and inert diluents to give the product the bulk desired. However, none of the admixtures or excipients mentioned in this or in the preceding paragraph is indispensable to the invention.

As a source of biotin I may employ crystalline biotin, but for economic reasons I prefer to use a less refined product. Generally I prefer to use a filtered yeast autolysate, from which the protein constituents have been substantially removed by precipitation in any of the manners well known to the art, such as for example precipitation by addition of an equal volume of ethyl alcohol, or with lead acetate and subsequent removal of the lead with hydrogen sulphide. I may also use a biotin concentrate prepared for example according to the method disclosed in the German Patent 661,929. If the preparation is to be applied in solid form, so that complete solubility is immaterial, I may even use dried yeast as the biotin carrying ingredient.

The following examples illustrate embodiments of the invention:

Example 1

| | |
|---|---|
| 2-methyl-5-ethoxymethyl-6-amino-pyridine hydrochloride mg | 20 |
| 4-methyl-5-beta-hydroxy-ethyl-thiazole mg | 14 |
| Biotin mg | 7 |
| Water ml | 150 |
| Paraoxybenzoic acid mg | 30 |

Example 2

| | |
|---|---|
| 2-methyl-5-ethoxymethyl-6-amino-pyridine hydrochloride mg | 20 |
| 4-methyl-5-beta-hydroxy-ethyl-thiazole mg | 14 |
| Biotin mg | 2 |
| Water gr | 100 |
| Ethyl alcohol gr | 22 |

Example 3

| | |
|---|---|
| 2-methyl-5-ethoxymethyl-6-amino-pyrimidine mg | 16.7 |
| 4-methyl-5-beta-hydroxy-ethyl-thiazole mg | 14.3 |
| Biotin mg | 12 |
| Glycerin gr | 30 |
| Water gr | 100 |
| Ethyl alcohol gr | 20 |

Example 4

| | |
|---|---|
| 2-methyl-5-ethoxymethyl-6-amino-pyrimidine nitrate mg | 23 |
| 4-methyl-5-beta-hydroxy-ethyl-thiazole mg | 14 |
| Biotin mg | 6 |
| Water gr | 20 |
| Mono potassium ortho phosphate mg | 200 |
| Parahydroxy benzoic acid mg | 40 |

Example 5

| | |
|---|---|
| 2-methyl-5-ethoxymethyl-6-amino-pyrimidine mg | 16.7 |
| 4-methyl-5-beta-hydroxy-ethyl-thiazole mg | 14.3 |
| Biotin mg | 7 |

Example 6

| | |
|---|---|
| 2-methyl-5-ethoxymethyl-6-amino-pyrimidine mg | 16.7 |
| 4-methyl-5-beta-hydroxy-ethyl-thiazole mg | 14.3 |
| Dry yeast grams | 20 |

Example 7

| | |
|---|---|
| 2-methyl-5-ethoxymethyl-6-amino-pyrimidine hydrochloride mg | 20.3 |
| 4-methyl-5-beta-hydroxy-ethyl-thiazole mg | 23 |
| Biotin concentrate prepared according to disclosure of German Patent 661,929 mg | 100 |
| Water gr | 130 |
| Ortho phosphoric acid mg | 200 |
| Ethyl alcohol gr | 20 |

Example 8

| | |
|---|---|
| 2-methyl-5-ethoxymethyl-6-amino-pyrimidine hydrochloride mg | 20 |
| 4-methyl-5-beta-hydroxy-ethyl-thiazole mg | 15 |
| Yeast autolysate from which protein constituents have been precipitated with ethyl alcohol gr | 20 |
| Water gr | 150 |
| Acetone gr | 15 |

Example 9

| | |
|---|---|
| 2-methyl-5-ethoxymethyl-6-amino-pyrimidine mg | 17 |
| 4-methyl-5-beta-hydroxy-ethyl-thiazole mg | 14 |
| Yeast autolysate gr | 20 |
| Urea hydrochloride gr | 5 |
| Water gr | 130 |

Example 10

| | |
|---|---|
| 2-methyl-5-ethoxymethyl-6-amino-pyrimidine mg | 17 |
| 4-methyl-5-beta-hydroxy-ethyl-thiazole mg | 14 |
| Yeast autolysate from which protein constituents have been precipitated with lead acetate gr | 10 |
| Citric acid mg | 200 |
| Sodium citrate mg | 50 |
| Ethyl alcohol gr | 20 |
| Water gr | 90 |

Example 11

| | |
|---|---|
| 2-methyl-5-ethoxymethyl-6-amino-pyrimidine mg | 17 |
| 4-methyl-5-beta-hydroxy-ethyl-thiazole mg | 14 |
| Biotin mg | 5 |
| Glycerine gr | 50 |
| Ethyl alcohol gr | 95 |
| Methyl alcohol gr | 5 |

For practical reasons I find it most convenient to prepare the products of my invention in such concentration or potency that an amount of the product between three drops (approximately .09 ml.) and 2 ml. diluted with one gallon of water gives a solution of concentration suitable for application to the plants by watering, but of course I may use solutions in concentrations requiring further dilution in proportions varying between one drop (approximately .03 ml.) and one tablespoon (approximately 25 ml.) to a gallon of water, or even beyond these limits. Accordingly, the formulas given in the above examples may be adjusted, by variations of the amounts of solvent, to suit any particular requirements or conditions of application.

When the product is used in solid form, I may use crystalline biotin, 2-methyl-5-ethoxymethyl-6-amino-pyrimidine and 4-methyl-5-beta-hydroxy-ethyl-thiazole without admixture of any other ingredients, or I may dilute them with any amount of excipients deemed practical for the applications at hand. As excipients I may use any of the plant fertilizing substances known to the art, such as urea, ammonium sulphate, potassium nitrate, phosphates, and the like, or any combinations of such fertilizers; inert ingredients such as kaolins; dissolution retarding absorbent agents such as fuller's earth, bentonite and the like; carbohydrate excipients such as starches, flours, glucose, saccharose, and the like. However, if alkaline substances, such as calcium hydroxide, are included in the compositions, moisture should be carefully avoided, since alkaline substances in the presence of moisture tend to promote reactions deleterious to the growth promoting potency of the compositions.

The compositions of my invention may be applied to the plants in any manner which results in introduction of growth promoting ingredients of the compositions into plant organisms. The most convenient method is usually to add the compositions to water used in watering the plants. The watering may be accomplished in any of the manners known to the art, such as spraying, basins, ditches, and the like.

When applying the invention in this manner I usually prefer to dilute the compositions of my invention in such proportions that in the final dilution 1 mg. of 2-methyl-5-ethoxymethyl-6-amino-pyrimidine or of 4-methyl-5-beta-hydroxy-ethyl-thiazole is contained in about 5 to 50 gallons of water, or 1 mg. of biotin in about 10 to 150 gallons of water. Usually it is sufficient to apply the compositions to the plants about once weekly.

I may also apply the compositions to the plants in solid form, either in concentrated form, or for greater convenience in handling, admixed with fertilizing materials, adsorbents, or with inert diluents or the like, as indicated above. In this case a convenient procedure is to dust the solid materials onto the soil in which the plants are growing, so that any subsequent irrigation will dissolve a part of the active material and carry it to the roots of the plants.

Further, I may supply the composition to the plant directly, by removing a part of the surface layer of the plant and applying the composition to the exposed inner parts of the plant. If a solution is used, this may be injected in the plant under pressure. This mode of application is sometimes advantageous in the treatment of very large plants, such as trees or the like.

In treating cuttings, a suitable procedure is to immerse the cut surfaces for about 10 to 20 hours in a solution containing 1 mg. of 2-methyl-5-ethoxymethyl-6-amino-pyrimidine and of 4-methyl-5-beta-hydroxy-ethyl-thiazole in about ¼ gallon to 12 gallons of water, and/or 1 mg. of biotin in about ½ to 50 gallons of water, before planting. More dilute solutions will also exert a beneficial effect on the rooting and subsequent growth, although to a lesser extent than the solutions indicated; more concentrated solutions are also suitable, although the benefits derived from increase in concentration beyond the limits stated are usually not commensurate with the increase in cost of the compositions.

The growth response is different for different plants, and the specific methods and concentrations stated above, while suitable under most circumstances, may require modification to suit particular plants or conditions of environment. The concentrations and modes of application best adapted to any particular set of conditions may be determined by trying various conditions and concentrations in actual growth tests, in manner obvious to those skilled in the art.

Clearly, for the purposes of this invention I may use instead of 4-methyl-5-beta-hydroxy-ethyl-thiazole, and as an equivalent therefor, any derivative which is transformed into this substance by reactions occurring under the conditions of application, such as hydrolysis as is the case for instance with salts thereof, or with substances derived from 4-methyl-5-beta-hydroxy-ethyl-thiazole by substitution of the oxy-group with an atom or a radical which can be split off by hydrolysis, as for example in 4-methyl-5-chloro-ethyl-thiazole, or salts thereof; or by addition of water to a double bond as in 4-methyl-5-vinyl-thiazole, or salts thereof.

Obvious equivalents of 2-methyl-5-ethoxy-methyl-6-amino-pyrimidine for the purposes of this invention are all salts thereof, and all other substances adapted to react with 4-methyl-5-beta-hydroxy-ethyl-thiazole so as to leave the grouping

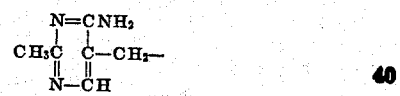

connected with the thiazole group, in the 3-position. Specifically, 2-methyl-5-bromo-methyl-6-amino-pyrimidine, 2-methyl-5-chloro-methyl-6-amino-pyrimidine and 2-methyl-5-amino-methyl-6-amino-pyrimidine and the nitrates and hydrochlorides thereof have been tested and found equivalent with 2-methyl-5-ethoxy-methyl-6-amino-pyrimidine for the purposes of this invention. 2-methyl-5-methoxy-methyl-6-amino-pyrimidine and 2-methyl-5-propyloxy-methyl-6-amino-pyrimidine and salts thereof have also been found suitable, although somewhat less effective.

I often find it advantageous to include in the compositions of my invention a buffering compound of any of the numerous types well known, to maintain the acidity of the composition at a pH between 2 and 4.5.

From the above disclosure it is apparent that the invention is capable of variations and modifications within wide limits depending on the particular applications contemplated and on the properties desired therefor. The above examples are not to be construed in any sense of limitation whatever, but are given to illustrate the invention, which is to be limited only by the following claims, in which it is intended to claim all novelty inherent in this invention as broadly as possible in view of prior art.

I claim:

1. A composition of matter comprising 2-methyl-5-ethoxy-methyl-6-amino-pyrimidine, 4-methyl-5-beta-hydroxy-ethyl-thiazole in substantially equimolecular proportions, and biotin and additionally comprising a substance of the class consisting of acids, and of salts of strong acids with relatively weak alkalies, and of acid salts, in amounts sufficient to bring the acidity of the composition to an acidity below pH 4.5.

2. A composition of matter comprising at least one salt of 2-methyl-5-ethoxy-methyl-6-amino-pyrimidine and of 4-methyl-5-hydroxy-ethyl-thiazole, in substantially equimolecular proportions, and biotin and additionally comprising a substance of the class consisting of acids, and of salts of strong acids with relatively weak alkalies, and of acid salts, in amounts sufficient to bring the acidity of the composition to an acidity below pH 4.5.

3. A composition of matter comprising a substance selected from the group consisting of substances having the general chemical formula

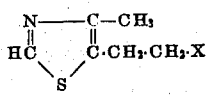

where X represents an atom or a radical which can be split off by hydrolysis; salts of such substances, 4 - methyl - 5 - vinyl - thiazole and salts thereof; a substance selected from the group having the general chemical formula

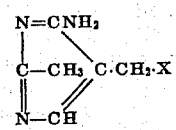

where X represents a halogen or an amino group or an oxy alkyl group, and salts of such substances; and further comprising biotin and additionally comprising a substance of the class consisting of acids, and of salts of strong acids with relatively weak alkalies, and of acid salts, in amounts sufficient to bring the acidity of the composition to an acidity below pH 4.5.

4. The improvement in accelerating plant growth which includes the step of subjecting a plant to the action of a composition of claim 3.

5. A composition of matter comprising a solution containing a substance selected from the group consisting of substances having the general chemical formula

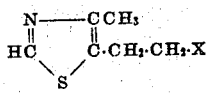

where X represents an atom or a radical which can be split off by hydrolysis, salts of such substances, 4 - methyl - 5 - vinyl - thiazole and salts thereof, in a concentration between .00008 and .7%; a substance selected from the group consisting of substances having the general chemical formula

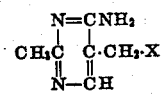

where X represents a halogen or an amino group or an oxy alkyl group, and salts of such substances, in a concentration between .00008 and .7%, and further comprising biotin in a concentration between .000027 and .33%, and comprising in addition an amount of ortho phosphoric acid sufficient to bring the acidity of the composition below pH 4.5.

6. The improvement in propagating plants, which comprises the step of immersing the basal end of a cutting in water containing the composition of claim 3.

7. The improvement in propagating plants, which comprises the step of exposing the basal end of a cutting to the action of the composition of claim 3.

8. The method of propagating plants which comprises the step of subjecting the basal end of a cutting to the action of the composition of claim 1.

9. The improvement in transplanting plants, which comprises the step of immersing the root system of a plant in a substantially aqueous solution comprising the composition of claim 3.

10. A composition of matter comprising a solution containing a substance selected from the group consisting of substances having the general chemical formula

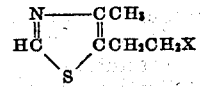

where X represents an atom or a radical which can be split off by hydrolysis, salts of such substances, 4 - methyl - 5 - vinyl - thiazole and salts thereof, in a concentration between .00008 and .7%; a substance selected from the group consisting of substances having the general chemical formula

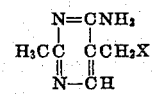

where X represents a halogen or an amino group or an oxy alkyl group, and salts of such substances, in a concentration between .00008 and .7%, and further comprising biotin in a concentration between .000027 and .33%, and comprising in addition a buffer compound adapted to maintain the acidity of the composition at an acidity between pH 2 and pH 4.5.

11. The method of stimulating plant growth, which comprises the step of making an incision in a plant and applying thereto a composition of claim 3.

12. The improvement in stimulating plant growth, which comprises the step of injecting into a plant a composition of claim 3.

13. A composition of matter comprising a substance selected from the group consisting of substances having the general chemical formula

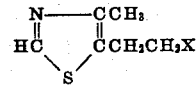

where X represents an atom or a radical which can be split off by hydrolysis; salts of such substances, 4 - methyl - 5 - vinyl - thiazole and salts thereof; a substance selected from the group consisting of substances having the general chemical formula

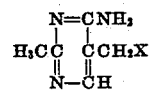

where X represents a halogen or an amino group or an oxy alkyl group, and salts of these substances; and further comprising dry yeast; and a buffer compound adapted to maintain the acidity of the composition when dissolved in water at an acidity between pH 2 and pH 4.5.

14. A composition of matter comprising a substance selected from the group consisting of substances having the general chemical formula $$\begin{array}{c} N\text{------}CCH_3 \\ \| \quad \quad \| \\ HC \quad \quad CCH_2CH_2X \\ \diagdown \diagup \\ S \end{array}$$

where X represents an atom or a radical which can be split off by hydrolysis; salts of such substances, 4 - methyl - 5 - vinyl - thiazole and salts thereof; a substance selected from the group consisting of substances having the general chemical formula $$\begin{array}{c} N=CNH_2 \\ | \quad \quad | \\ H_3CC \quad CCH_2X \\ \| \quad \quad \| \\ N\text{---}CH \end{array}$$

where X represents a halogen or an amino group or an oxy alkyl group, and salts of these substances; and further comprising a yeast autolysate; and a buffer compound adapted to maintain the acidity of the composition at an acidity between pH 2 and pH 4.5.

15. A composition of matter comprising a substance selected from the group consisting of substances having the general chemical formula $$\begin{array}{c} N\text{------}CCH_3 \\ \| \quad \quad \| \\ HC \quad \quad CCH_2CH_2X \\ \diagdown \diagup \\ S \end{array}$$

where X represents an atom or a radical which can be split off by hydrolysis; salts of such substances, 4 - methyl - 5 - vinyl - thiazole and salts thereof; a substance selected from the group consisting of substances having the general chemical formula $$\begin{array}{c} N=CNH_2 \\ | \quad \quad | \\ H_3CC \quad CCH_2X \\ \| \quad \quad \| \\ N\text{---}CH \end{array}$$

where X represents a halogen or an amino group or an oxy alkyl group, and salts of these substances; and further comprising a yeast autolysate from which the protein constituents have been substantially removed; and a buffer compound adapted to maintain the acidity of the composition at an acidity between pH 2 and pH 4.5.

16. A composition of matter comprising a substance selected from the group consisting of substances having the general chemical formula $$\begin{array}{c} N\text{------}CCH_3 \\ \| \quad \quad \| \\ HC \quad \quad CCH_2CH_2X \\ \diagdown \diagup \\ S \end{array}$$

where X represents an atom or a radical which can be split off by hydrolysis; salts of such substances, 4 - methyl - 5 - vinyl - thiazole and salts thereof; a substance selected from the group consisting of substances having the general chemical formula $$\begin{array}{c} N=CNH_2 \\ | \quad \quad | \\ H_3CC \quad CCH_2X \\ \| \quad \quad \| \\ N\text{---}CH \end{array}$$

where X represents a halogen or an amino group or an oxy alkyl group, and salts of these substances; and further comprising a biotin containing yeast product, and a buffer compound adapted to maintain the acidity of the composition at an acidity between pH 2 and pH 4.5.

17. The improvement in stimulating plant growth which comprises the step of subjecting a plant to the action of a composition of matter comprising a substance selected from the group consisting of substances having the general chemical formula $$\begin{array}{c} N\text{------}CCH_3 \\ \| \quad \quad \| \\ HC \quad \quad CCH_2CH_2X \\ \diagdown \diagup \\ S \end{array}$$

where X represents an atom or a radical which can be split off by hydrolysis; salts of such substances; 4 - methyl - 5 - vinyl - thiazole and salts thereof; a substance selected from the group consisting of substances having the general chemical formula $$\begin{array}{c} N=CNH_2 \\ | \quad \quad | \\ H_3CC \quad CCH_2X \\ \| \quad \quad \| \\ N\text{---}CH \end{array}$$

where X represents a halogen or an amino group or an oxy alkyl group, and salts of these substances; and further comprising a biotin containing yeast product, and a buffer compound adapted to maintain the acidity of the composition at an acidity between pH 2 and pH 4.5.

18. The improvement in transplanting plants, which comprises the step of immersing the root system of a plant in a substantially aqueous solution comprising a composition of matter comprising a substance selected from the group consisting of substances having the general chemical formula $$\begin{array}{c} N\text{------}CCH_3 \\ \| \quad \quad \| \\ HC \quad \quad CCH_2CH_2X \\ \diagdown \diagup \\ S \end{array}$$

where X represents an atom or a radical which can be split off by hydrolysis; salts of such substances, 4 - methyl - 5 - vinyl - thiazole and salts thereof; a substance selected from the group consisting of substances having the general chemical formula $$\begin{array}{c} N=CNH_2 \\ | \quad \quad | \\ H_3CC \quad CCH_2X \\ \| \quad \quad \| \\ N\text{---}CH \end{array}$$

where X represents a halogen or an amino group or an oxy alkyl group, and salts of these substances; and further comprising a biotin containing yeast product, and a buffer compound adapted to maintain the acidity of the composition at an acidity between pH 2 and pH 4.5.

19. A composition of matter comprising a substance selected from the group consisting of substances having the general chemical formula $$\begin{array}{c} N\text{------}CCH_3 \\ \| \quad \quad \| \\ HC \quad \quad CCH_2CH_2X \\ \diagdown \diagup \\ S \end{array}$$

where X represents an atom or a radical which can be split off by hydrolysis; salts of such substances, 4 - methyl - 5 - vinyl - thiazole and salts thereof; a substance selected from the group consisting of substances having the general chemical formula $$\begin{array}{c} N=CNH_2 \\ | \quad \quad | \\ CCH_2 \quad CCH_2X \\ \| \quad \quad \| \\ N\text{---}CH \end{array}$$

where X represents a halogen or an amino group or an oxy alkyl group, and salts of these substances; and further comprising biotin, and also a salt of a strong acid with a weak base, in quantities sufficient to maintain the acidity of the composition at an acidity below pH 4.5.

JOHAN BJORKSTEN.